(12) United States Patent
Zhu et al.

(10) Patent No.: US 12,256,276 B2
(45) Date of Patent: Mar. 18, 2025

(54) PER-SSB BEAM SWITCHING FOR NEIGHBOR CELL MEASUREMENT IN A SYNCHRONIZED NETWORK

(71) Applicant: QUALCOMM Incorporated, San Diego, CA (US)

(72) Inventors: Jun Zhu, San Diego, CA (US); Ruhua He, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 16/879,288

(22) Filed: May 20, 2020

(65) Prior Publication Data

US 2020/0413309 A1    Dec. 31, 2020

Related U.S. Application Data

(60) Provisional application No. 62/867,044, filed on Jun. 26, 2019.

(51) Int. Cl.
*H04W 36/00* (2009.01)
*H04W 24/08* (2009.01)
*H04W 56/00* (2009.01)

(52) U.S. Cl.
CPC ....... *H04W 24/08* (2013.01); *H04W 36/0085* (2018.08); *H04W 56/001* (2013.01); *H04W 36/00837* (2018.08)

(58) Field of Classification Search
CPC ............. H04W 24/08; H04W 36/0083; H04W 36/00835; H04W 36/00837;
(Continued)

(56) References Cited

U.S. PATENT DOCUMENTS

2013/0237218 A1    9/2013  Li et al.
2017/0273062 A1    9/2017  Liu et al.
(Continued)

FOREIGN PATENT DOCUMENTS

CA        3048935 A1    12/2018
CN      108352874 A     7/2018
(Continued)

OTHER PUBLICATIONS

International Search Report and Written Opinion—PCT/US2020/033970—ISA/EPO—Jul. 29, 2020.
(Continued)

*Primary Examiner* — Matthew W Genack
(74) *Attorney, Agent, or Firm* — Patterson & Sheridan LLP

(57) ABSTRACT

Certain aspects of the present disclosure provide techniques for receive beam switching for neighbor cell measurement. A method that may be performed by a user equipment (UE) includes determining a first receive beam of a plurality of receive beams to use for reception during a first synchronization signal block (SSB) duration within a synchronization signal block set (SSBS) duration. The method includes determining a second receive beam of the plurality of receive beams to use for reception during a second SSB duration within the SSBS duration. The UE may measure one or more first signals transmitted by a serving cell and/or one or more neighbor cells with the first receive beam during the first SSB duration and measure one or more second signals transmitted by the serving cell and/or the one or more neighbor cells with the second receive beam during the second SSB duration.

23 Claims, 9 Drawing Sheets

(58) Field of Classification Search
CPC ......... H04W 36/0085; H04W 36/0088; H04W 36/0094; H04W 56/001
See application file for complete search history.

(56) References Cited

U.S. PATENT DOCUMENTS

| | | | |
|---|---|---|---|
| 2018/0084473 A1 | 3/2018 | Nagaraja et al. | |
| 2018/0279286 A1* | 9/2018 | Akoum | H04W 72/046 |
| 2018/0368088 A1 | 12/2018 | Nagaraja et al. | |
| 2018/0376438 A1 | 12/2018 | Islam et al. | |
| 2020/0037277 A1 | 1/2020 | Huang et al. | |
| 2020/0044806 A1* | 2/2020 | Jassal | H04L 5/0053 |

FOREIGN PATENT DOCUMENTS

| | | |
|---|---|---|
| EP | 3589036 A1 | 1/2020 |
| TW | 201921980 A | 6/2019 |
| WO | 2018053093 A1 | 3/2018 |
| WO | 2018171681 A1 | 9/2018 |

OTHER PUBLICATIONS

LG Electronics: "Discussion on Gap for Intra-frequency Measurement in FR2," 3GPP Draft, 3GPP TSG-RAN WG4 Meeting AH-1801, R4-1800427, 3rd Generation Partnership Project (3GPP), Mobile Competence Centre, 650, Route Des Lucioles, F-06921, Sophia-Antipolis Cedex, France, vol. RAN WG4, No. San Diego. US, Jan. 22, 2018-Jan. 26, 2018, Jan. 15, 2018 (Jan. 15, 2018), XP051388059, 3 pages, Retrieved from the Internet: URL: http://www.3gpp.org/ftp/tsg%5Fran/WG4%5FRadio/TSGR4%5FAHs/TSGR4%5FAH%2D1801/Docs/ [retrieved on Jan. 15, 2018], section 2, figures 2,3.
ZTE: "RRM Measurements on SS Block", 3GPP Draft; R1-1712068, 3rd Generation Partnership Project (3GPP), Mobile Competence Centre ; 650, Route Des Lucioles ; F-06921 Sophia-Antipolis Cedex; France, vol. RAN WG1, No. Prague, Czechia; Aug. 21, 2017-Aug. 25, 2017, Aug. 20, 2017 (Aug. 20, 2017), 10 Pages, XP051314888, Retrieved from the Internet: URL: http://www.3gpp.org/ftp/Meetings_3GPP_SYNC/RAN1/Docs/ [retrieved on Aug. 20, 2017], Whole section 5.
3GPP TS 38.213, "3rd Generation Partnership Project; Technical Specification Group Radio Access Network; NR; Physical Layer Procedures for Control(Release 15)", 3GPP TS 38.213, V15.6.0, Jun. 2019, 3 Pages, Section 4-4.1.
LG Electronics: "Discussion on Gap for Intra-frequency Measurement in FR2", 3GPP TSG-RAN WG4 Meeting AH-1801, R4-1800427, vol. RAN WG4, No. San Diego, US, Jan. 22, 2018-Jan. 26, 2018, Jan. 15, 2018, 3 Pages.
Taiwan Search Report—TW109116886—TIPO—Oct. 17, 2023.
ZTE: "RRM Measurements on SS Block", 3GPP TSG RAN WG1 Meeting #90, R1-1712068, vol. RAN WG1, No. Prague, Czechia, Aug. 21, 2017-Aug. 25, 2017, Aug. 20, 2017, 10 Pages.

* cited by examiner

PER-SSB BEAM SWITCHING FOR NEIGHBOR CELL MEASUREMENT IN A SYNCHRONIZED NETWORK

CROSS-REFERENCE TO RELATED APPLICATION(S)

This application claims benefit of and priority to U.S. Provisional Application No. 62/867,044, filed Jun. 26, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for beam switching.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include additional measurement opportunities and improved mobility in a synchronized network.

Certain aspects provide a method for wireless communication by a user equipment (UE). The method generally includes determining a first receive beam of a plurality of receive beams to use for reception during a first synchronization signal block (SSB) duration within a synchronization signal block set (SSBS) duration. The method generally includes determining a second receive beam of the plurality of receive beams to use for reception during a second SSB duration within the SSBS duration.

Certain aspects provide an apparatus for wireless communication. The apparatus generally includes means for determining a first receive beam of a plurality of receive beams to use for reception during a first SSB duration within a SSBS duration. The apparatus generally includes means for determining a second receive beam of the plurality of receive beams to use for reception during a second SSB duration within the SSBS duration.

Certain aspects provide an apparatus for wireless communication. The apparatus generally includes at least one processor and a memory coupled with the at least one processor. The processor and memory are configured to determine a first receive beam of a plurality of receive beams to use for reception during a first SSB duration within a SSBS duration and to determine a second receive beam of the plurality of receive beams to use for reception during a second SSB duration within the SSBS duration.

Certain aspects provide a computer readable medium storing computer executable code thereon for wireless communication. The computer readable medium generally includes code for determining a first receive beam of a plurality of receive beams to use for reception during a first SSB duration within a SSBS duration. The computer readable medium generally includes code for determining a second receive beam of the plurality of receive beams to use for reception during a second SSB duration within the SSBS duration.

Aspects of the present disclosure provide means for, apparatus, processors, and computer-readable mediums for performing techniques and methods that may be complementary to the operations by the UE described herein, for example, by a base station (BS).

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
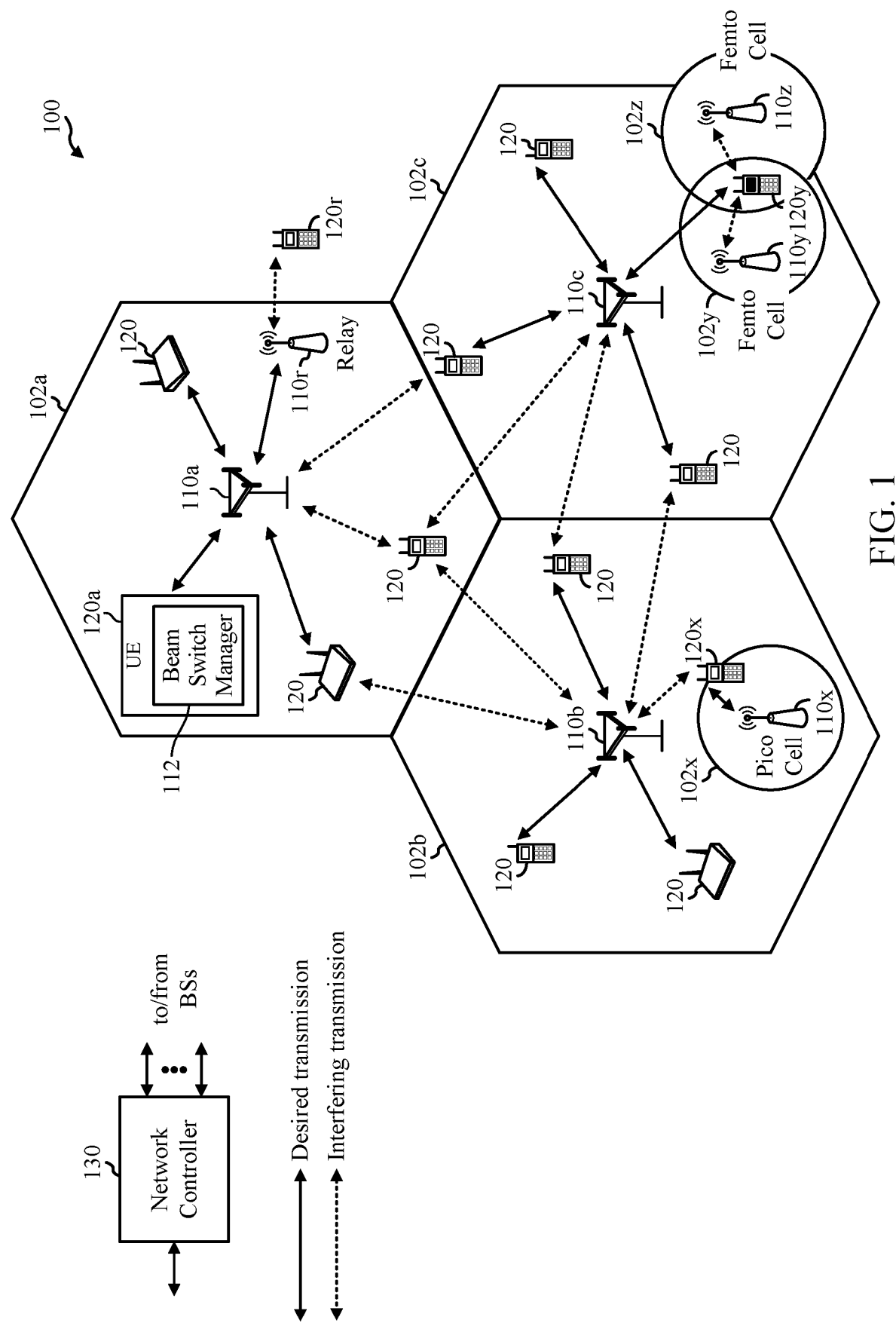
FIG. 1 is a block diagram conceptually illustrating an example wireless communications network, in accordance with certain aspects of the present disclosure.

Aspects of the present disclosure provide apparatus, methods, processing systems, and computer readable mediums for beam switching.

Certain systems, such as a new radio system (e.g., 5G NR systems) use beam forming. Beam forming may be used to overcome path loss in millimeter wave (mmW) systems (e.g., such as in 5G NR). To support beamforming, devices in the system, such as user equipment (UE) and/or base station (BS) devices, perform beam management to identify, select, and/or refine one or more beam pair links (BPLs) between the devices. A BPL may consist of a receive (RX) beam at the receiving device and a transmit (TX) beam at the transmitting device. For the serving cell and different neighbor cells (Ncells), a UE may use different beams to form different BPLs. The UE can perform measurements of the serving cell and the different Ncells in order to determine the BPLs. In order to perform the measurement, the UE switches its UE RX beams. In some examples, the UE uses its UE RX beam to measure synchronization signal blocks (SSBs) transmitted from the serving cell and/or one or more Ncells using respective TX beam(s). In some systems the UE uses the same UE RX beam to measure SSBs during SSB measurement opportunities of an SSB set (SSBS), that may include up to sixty-four SSB transmissions. The UE may switch the UE RX beam for different SSBSs.

Aspects of the present disclosure, provide for per-SSB switching in order to provide additional measurement opportunities and improved mobility. In aspects, the UE can align measurements to measure both the serving cell and a neighbor cell using a single beam in a measurement opportunity.

The following description provides examples of bam switching in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems. NR access may support various wireless communication services, such as enhanced mobile broadband (eMBB) targeting wide bandwidth (e.g., 80 MHz or beyond), millimeter wave (mmW) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces. A network controller 130 may couple to a set of BSs 110 and provide coordination and control for these BSs 110. The network controller 130 may communicate with the BSs 110 via a backhaul.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for beamforming. As shown in FIG. 1, the UE 120a includes a beam switch manager 122. The beam switch manager 122 may be configured to determine a first receive beam of a plurality of receive beams to use for reception during a first SSB duration within a SSBS duration and determine a second receive beam of the plurality of receive beams to use for reception during a second SSB duration within the SSBS duration. The UE 120a measures one or more first signals transmitted by a serving cell (e.g., BS 110a) and/or one or more neighbor cells with the first receive beam during the first SSB duration and measures one or more second signals transmitted by the serving cell and/or the one or more neighbor cells with the second receive beam during the second SSB duration, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

Figure 2:
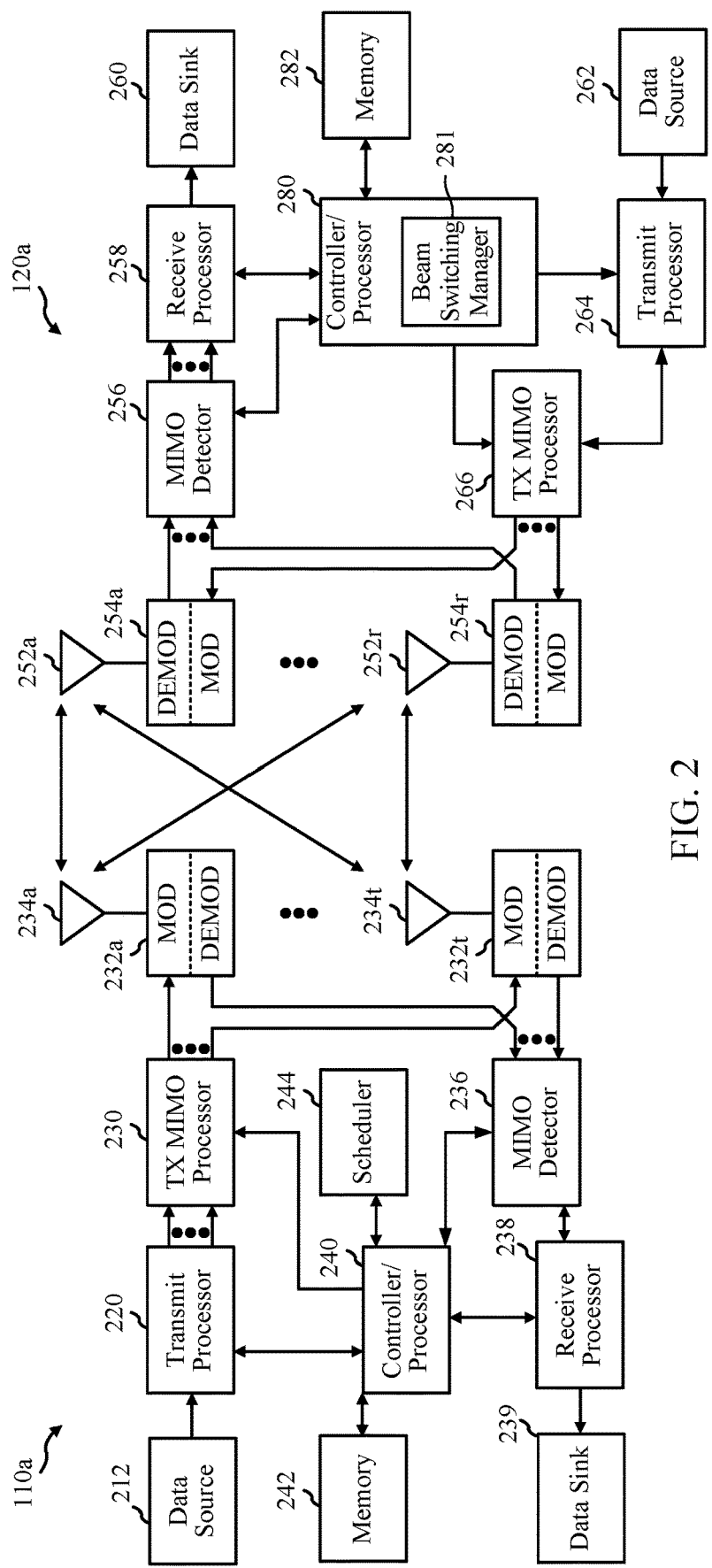
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH, etc. The processor 220 may process (e.g., encode and symbol map) the data and control information to obtain data symbols and control symbols, respectively. The transmit processor 220 may also generate reference symbols, such as for the PSS, SSS, and channel state information reference signal (CSI-RS). A TX multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 934, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 280 of the UE 120a has a beam switch manager 281 that may be configured for determining a first receive beam of a plurality of receive beams to use for reception during a first SSB duration within a SSBS duration; determining a second receive beam of the plurality of receive beams to use for reception during a second SSB duration within the SSBS duration; measuring one or more first signals transmitted by a serving cell and/or one or more neighbor cells with the first receive beam during the first SSB duration; and measuring one or more second signals transmitted by the serving cell and/or the one or more neighbor cells with the second receive beam during the second SSB duration, according to aspects described herein. Although shown at the controller/processor, 281 other components of the UE 120*a* may be used performing the operations described herein.

As mentioned above, in certain systems, (e.g., 5G NR systems) beam management procedures may be used to determine BPLs for beam forming. In 5G NR, for example, a UE (e.g., such as a UE 120) and a BS (such as a BS 110), which may be a Next Generation Node B (gNB), communicate (e.g., over data and control channels) using a BPL formed by a BS TX beam and a UE RX beam on the downlink and a UE TX beam and BS RX beam on the uplink.

An example of a beam management procedure is a beam discovery procedure. In some examples, for initial cell acquisition, a UE (e.g., UE 120*a*) may search for a strongest signal corresponding to a cell associated with a BS (e.g., BS 110*a*) and the associated UE receive beam and BS transmit beam corresponding to a BPL used to receive/transmit the reference signal. After initial acquisition, the UE 120*a* may perform new cell detection and measurement. For example, the UE 120*a* may measure PSS and/or SSS to detect new cells (e.g., associated with the BS 110*a* and/or another BS 110). The PSS/SSS may be transmitted by a BS (e.g., BS 110) in different SSBs across one or more SSBSs (also sometimes referred to as SS burst sets). The UE 120*a* can measure the different SSBs to search for BPLs.

Figure 3:
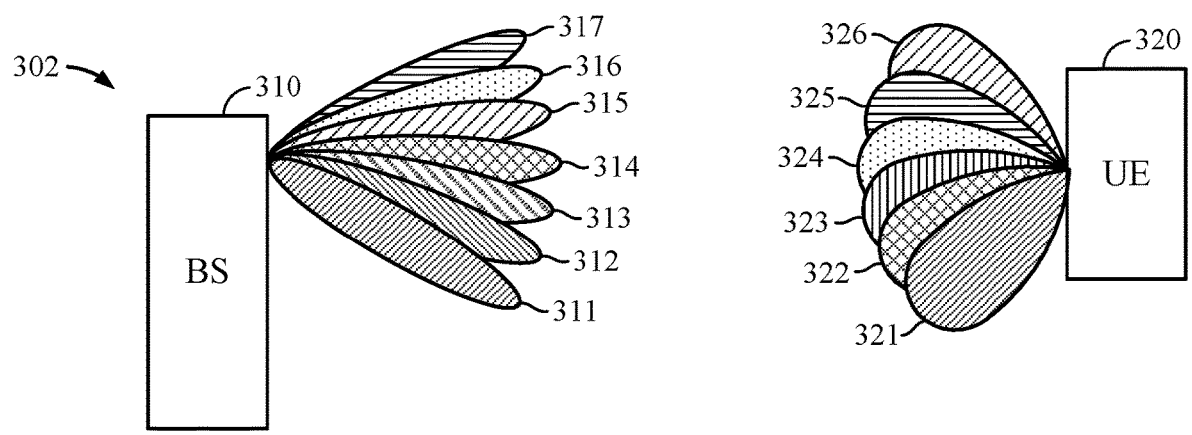
FIG. 3 illustrates an example beam management procedures in accordance with certain aspects of the present disclosure.

FIG. 3 illustrates an example beam discovery procedure 302. A BS 310 (e.g., such as the BS 110*a*) may send a measurement request to a UE 320 (e.g., such as the UE 120*a*) and may subsequently transmit one or more signals to the UE 320 for measurement. In the beam discovery procedure 302, the BS 310 transmits the beam discovery signal with beam forming in a different spatial direction (corresponding to a transmit beam 311-317) in each symbol, such that several (e.g., most or all) relevant spatial locations of the cell of the BS 310 are reached. In this manner, the BS 310 transmits the beam discovery signal using different transmit beams over time in different directions.

In the beam discovery procedure 302, to successfully receive at least a symbol of the reference signal, the UE 320 finds (e.g., determines/selects) an appropriate receive beam (321-326). Signals (e.g., SSBs) from multiple BSs can be measured simultaneously for a given signal index (e.g., SSB index) corresponding to a given time period. The UE 320 can apply a different receive beam during the beam discovery procedure. Once the UE 320 succeeds in receiving a symbol of the beam discovery signal, the UE 320 and BS 310 have discovered a BPL (i.e., the UE RX beam used to receive the beam discovery signal in the symbol and the BS TX beam used to transmit the beam discovery signal in the symbol). The UE 320 may not know which beam the BS 310 used to transmit the bam discovery signal in a symbol; however, the UE 320 may report to the BS 310 the time at which it observed the beam discovery signal. For example, the UE 320 may report the symbol index in which the beam discovery signal was successfully received to the BS 310. The BS 310 may receive this report and determine which BS TX beam the BS 310 used at the indicated time. In some examples, the UE 320 measures signal quality of the beam discovery signal, such as reference signal receive power (RSRP) or another signal quality parameter (e.g., SNR, channel flatness, etc.). The UE 320 may report the measured signal quality (e.g., RSRP) to the BS 310 together with the symbol index. In some cases, the UE 320 may report multiple symbol indices to the BS 310, corresponding to multiple BS TX beams.

In some examples, SSB is used as the beam discovery signal. In some examples, the SSB can be transmitted up to sixty-four times with up to sixty-four different beam directions, within an SSBS. SSBs in an SSBS may be transmitted in the same frequency region, while SSBs in different SSBSs can be transmitted in different frequency regions. The SSB may include a PSS, a SSS, and a two symbol physical broadcast channel (PBCH). The PSS and SSS may be used by UEs for the cell search and acquisition. For example, the PSS may provide half-frame timing, the SSS may provide the control protocol (CP) length and frame timing, and the PSS and SSS may provide the cell identity. The PBCH carries some basic system information, such as downlink system bandwidth, timing information within radio frame, SSBS periodicity, system frame number, etc.

In order to measure the serving cell and different Ncells, the UE may use different UE RX beams. Thus, the UE switches its UE RX beams, for example, to point to different cells to assure signal quality. In some systems, the UE RX beam is fixed during the entire search window. For example, the same UE RX beam may be used during the entire SSBS (e.g., 20 ms depending on the SSBS periodicity and the UE RX beam is switched per SSBS). Such per-SSBS beam switching wastes measurement opportunities. As mentioned above, the SSB can be transmitted up to 64 times within an SSBS.

Figure 4:
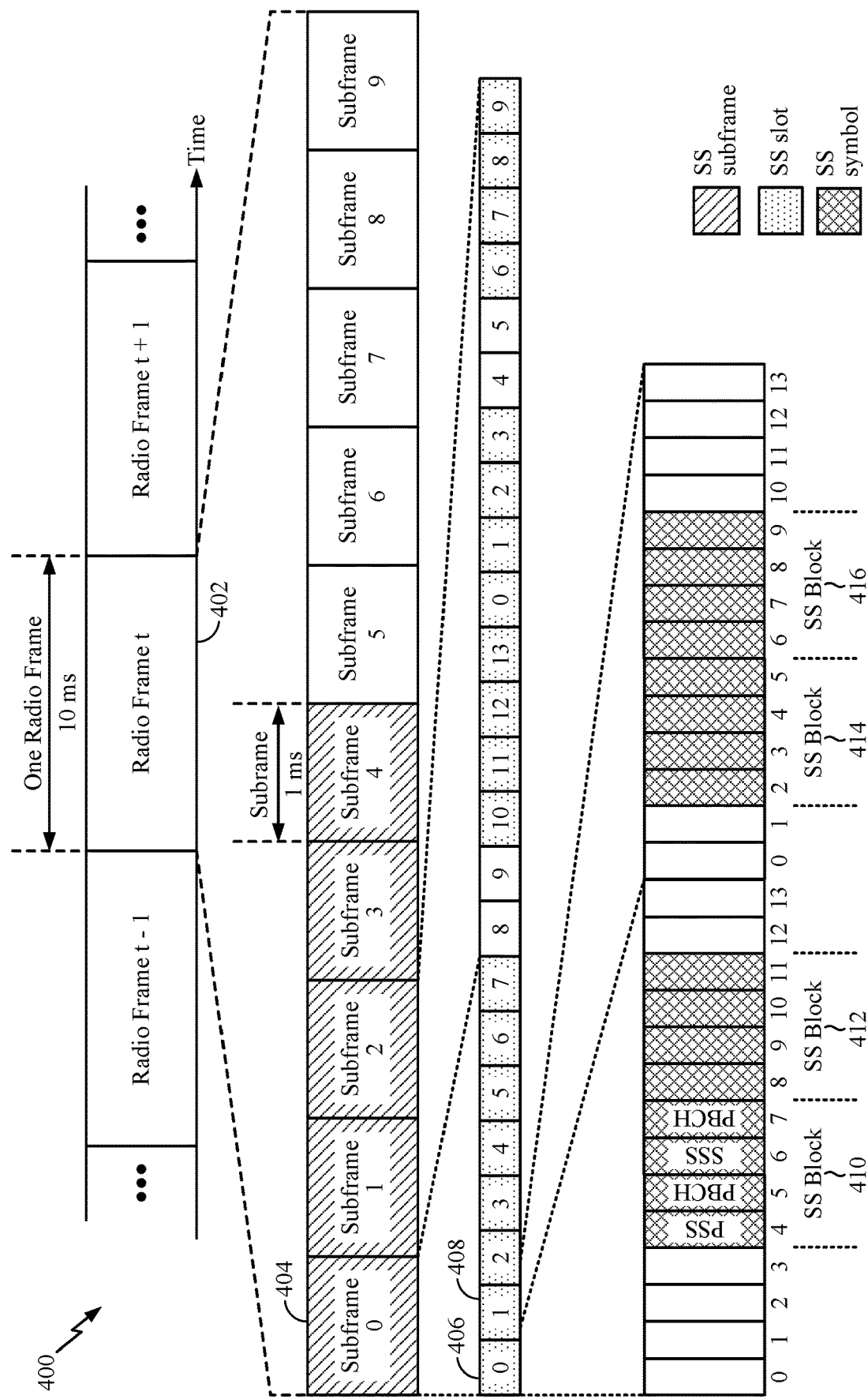
FIG. 4 illustrates example synchronization signal block (SSB) locations within an example half-frame for a 120 kHz subcarrier spacing (SCS), in accordance with certain aspects of the present disclosure.

FIG. 4 illustrates example SSB locations within an example NR radio frame format 402.

NR may utilize orthogonal frequency division multiplexing (OFDM) with cyclic prefix (CP) on the downlink and single-carrier frequency division multiplexing (SC-FDM) on the uplink. OFDM and SC-FDM partition the system bandwidth into multiple orthogonal subcarriers, also referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers may be dependent on the system bandwidth. For example, the spacing of the subcarriers may be 15 kHz and the minimum resource allocation (called a "resource block" (RB)) may be 12 consecutive subcarriers (or 180 kHz). The system bandwidth may also be partitioned into subbands covering multiple RBs.

Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In the illustrative example in FIG. 4, the SSBS is 5 ms (e.g., 5 one-millisecond subframes 0, 1, . . . , 4). In the example NR frame format 402, in the subframe 404, SSB is transmitted in each of the slots (slots 0, 1, ..., 7). In the slot 406 (slot 0), an SSB 410 is transmitted in the symbols 4, 5, 6, 7 and an SSB 412 is transmitted in the symbols 8, 9, 10, 11, and in the slot 408 (slot 1), an SSB 414 is transmitted in the symbols 2, 3, 4, 5 and an SSB 416 is transmitted in the symbols 6, 7, 8, 9, and so on. Thus, there are up to 64 measurement opportunities per SSBS.

Figure 5:
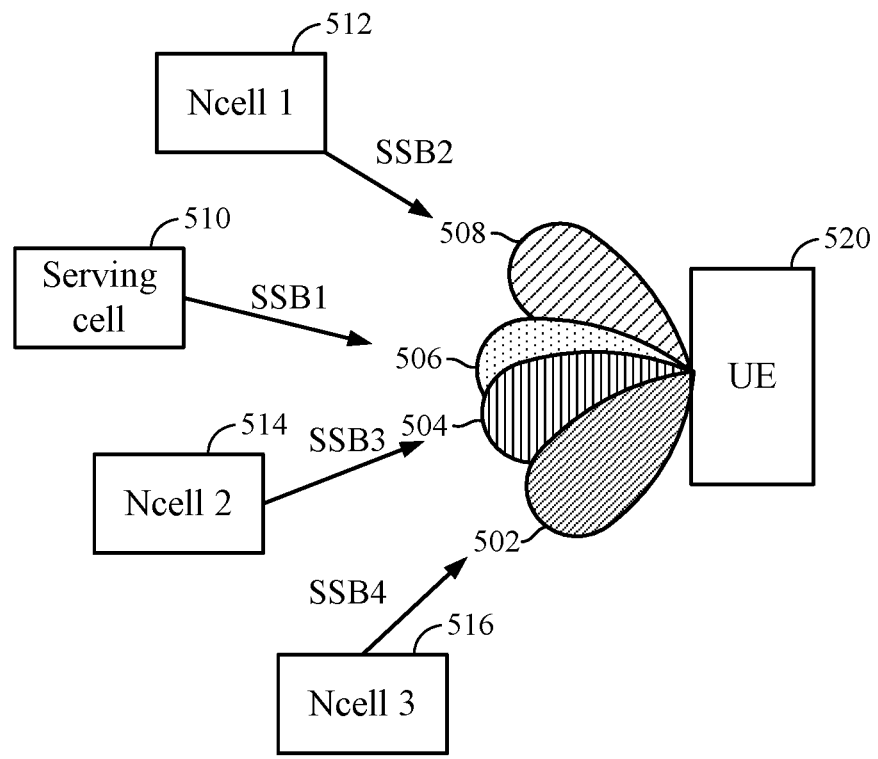
FIG. 5 is a block diagram illustrating example different beams for measuring different cells in an example network geometry, in accordance with certain aspects of the present disclosure.

When the UE RX beam is fixed per SSBS, only the cells with a BPL associated with current UE RX beam can be measured. In this case, the UE may need many cycles to measure all cells (serving cell and Ncells). For example, as shown in FIG. 5, a UE 520 may use UE RX beam 506 to measure an SSB1 from the serving cell 510, a UE RX beam 508 to measure an SSB2 from Ncell 512 (Ncell 1), a UE RX beam 504 to measure an SSB3 from Ncell 514 (Ncell 2), and a UE RX beam 502 to measure an SSB4 from Ncell 516 (Ncell 3). If the UE 520 switches its UE RX beam per-SSBS, then the UE 520 would take four SSBS (e.g., 20 ms*4=80 ms) to measure all of the cells in FIG. 5.

The time for the UE to measure all of the cells may impact mobility. In order to make a decision for cell reselection and handover, the UE measures (e.g., RSRP) the serving cell and Ncells. The measurement delay may lead to radio link failure. Therefore, per-SSBS UE RX beam switching periodicity may be too long.

Further, a UE RX beam switching periodicity that is too short may lead to issues. In a synchronized network (sometimes referred to as a Sync Network), SSBs transmitted from the serving cell and Ncells are synchronized. However, the timing of the serving cells and Ncells may not be perfectly aligned. For example, the timing of the serving cells and Ncells may only be aligned within ±3 µs. In addition, there may be a propagation delay due to relative distances of different cells. If the UE switches its UE RX beams per-symbol, then UE may not be able to perform parallel measurement on both serving cell and neighbor cells, as their timings may not be fully aligned.

Accordingly, techniques for UE RX beam switching are desirable.

Example Per-SSB Beam Switching for Neighbor Cell Measurement in a Synchronized Network Aspects of the present disclosure provide for per-SSB (synchronization signal block) switching in order to provide additional measurement opportunities, and improved mobility, and allows parallel measurement on the serving cells and neighbor cells (Ncells).

Figure 6:
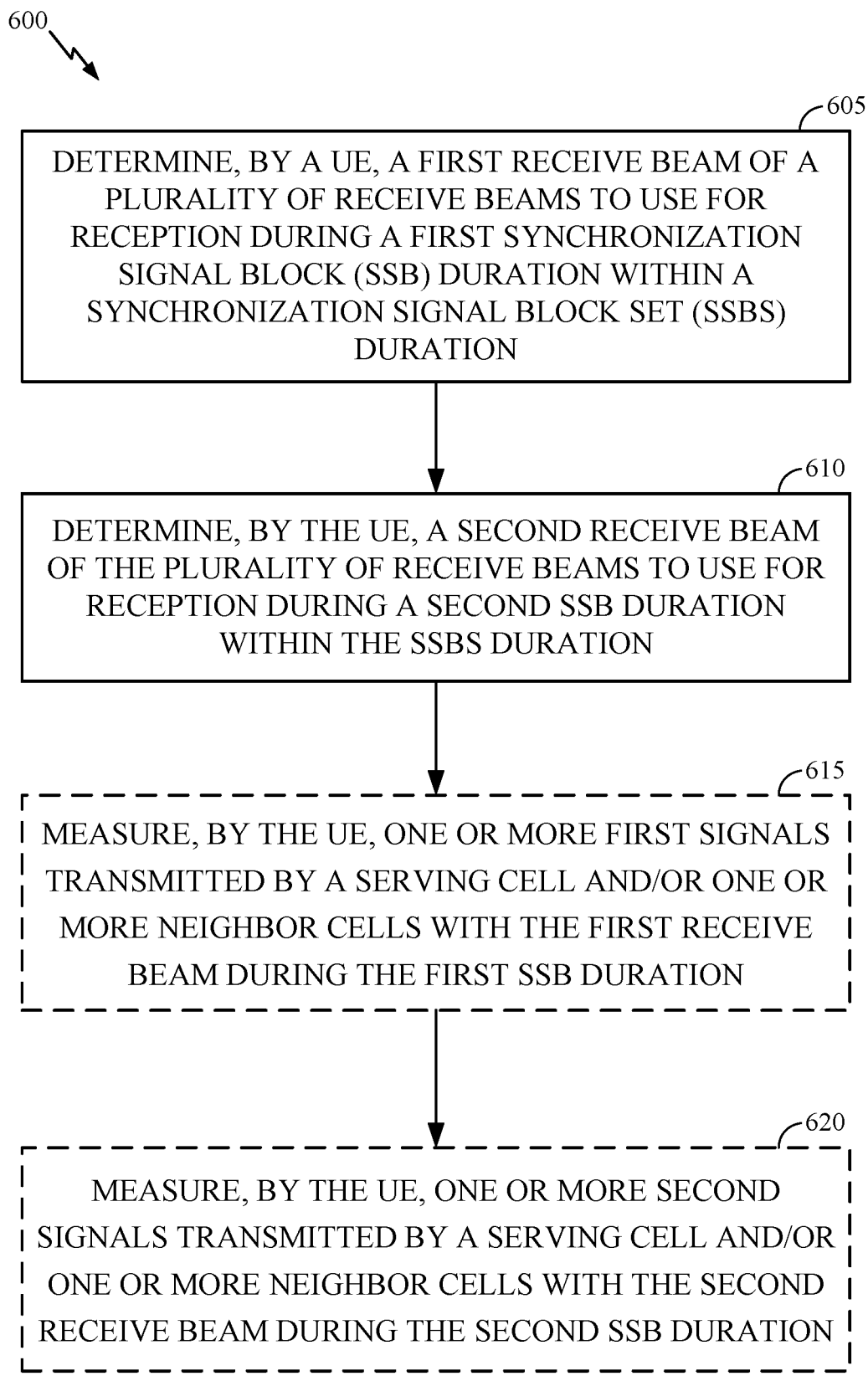
FIG. 6 is a flow diagram illustrating example operations for wireless communication by a user equipment (UE), in accordance with certain aspects of the present disclosure.

FIG. 6 is a flow diagram illustrating example operations 600 for wireless communication, in accordance with certain aspects of the present disclosure. The operations 600 may be performed, for example, by a user equipment (e.g., such as a UE 120a in the wireless communication network 100). Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at 605, by determining a first receive beam of a plurality of receive beams to use for reception during a first SSB duration within a SSBS duration.

At 610, the UE determines a second receive beam of the plurality of receive beams to use for reception during a second SSB duration within the SSBS duration.

The UE may switch from using the first receive beam to the second receive beam at a SSB boundary between the first SSB duration and the second SSB duration. In some examples, the UE may switch the UE receive beam for every SSB in the SSBS.

The one or more first signals and the one or more second signals may be transmitted by a combination of the serving cell and at least one neighboring cell. For example, the UE measures the serving cell and one or more Ncells in parallel.

In some examples (optionally at 615), the UE measures one or more first signals transmitted by at least one of: a serving cell, one or more neighbor cells, or a combination thereof, with the first receive beam during the first SSB duration.

In some examples (optionally at 620), the UE measures one or more second signals transmitted by at least one of: the serving cell, the one or more neighbor cells, or the combination thereof, with the second receive beam during the second SSB duration.

According to certain aspects, the UE may send one or more measurement reports (e.g., to the serving gNB) providing results of measuring the one or more first signals and the one or more second signals.

According to certain aspects, the UE may determine a time offset for switching from using the first receive beam to the second receive beam such that, during each of the first SSB duration and the second SSB duration, a SSS from synchronized SSBs of the serving cell and the at least one neighbor cell are measured. The UE may determine a maximum time offset based, at least in part, on a timing offset between the serving cell and a neighbor cell and further based on a propagation delay between the serving cell and the neighbor cell. The neighbor cell is the neighbor cell with a largest offset from the serving cell. The UE may determine the time offset based, at least in part, on a configured subcarrier spacing (SCS). In some examples, the UE determines a maximum time offset between the serving cell and the neighbor cell; a symbol duration based on a configured SCS; and a number of symbols for the time offset to be greater than a number of symbols in the maximum time offset between the serving cell and the neighbor cell.

Although the SSBs transmitted by cells in a synchronized network are synchronized (e.g., coordinated), the SSBs still may not be perfectly aligned. For example, there can be a timing offset (e.g., a misalignment) at the gNB side (e.g., between the serving cell and Ncells). In some examples, the timing offset is up to ±3 µs. In addition, there may be a propagation delay (e.g., due to the relative distances of the serving cell and Ncells from the UE). In some examples, the propagation delay up to 1.7 µs. Thus, a total offset may be up to 4.7 µs. This total offset may be referred to as the maximum time offset (e.g., max_sync_ncell_time_offset).

Figure 7:
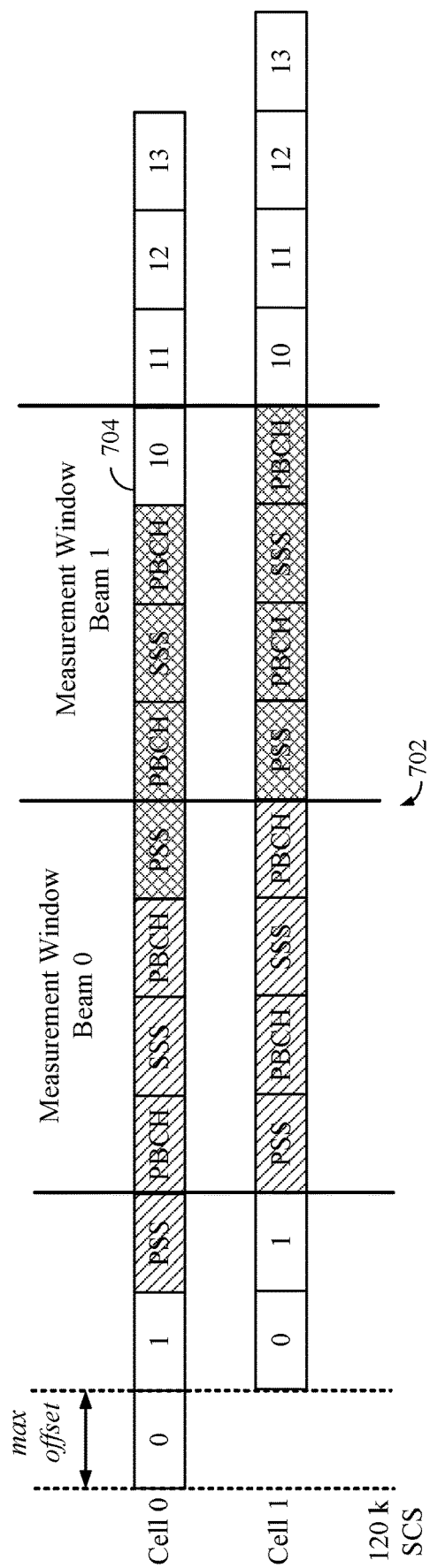
FIG. 7 illustrates example SSB locations within an example half-frame for a 120 kHz SCS, in accordance with certain aspects of the present disclosure.

In a 120 kHz SCS system, the symbol duration is 8.3 µs. Thus, the maximum time offset may always be less than 1 symbol. As shown in FIG. 7, by switching the UE RX beam at the SSB boundary 702 with the 1 symbol offset 704, the UE can ensure that each measurement window includes a SS from both the cell 0 and the cell 1, allowing parallel measurement of cell 0 and cell 1 in each measurement opportunity. For example, the per-SSB switching may ensure that each measurement window includes an SSS from the serving cell and all neighbor cells in the synchronized network.

Figure 8:
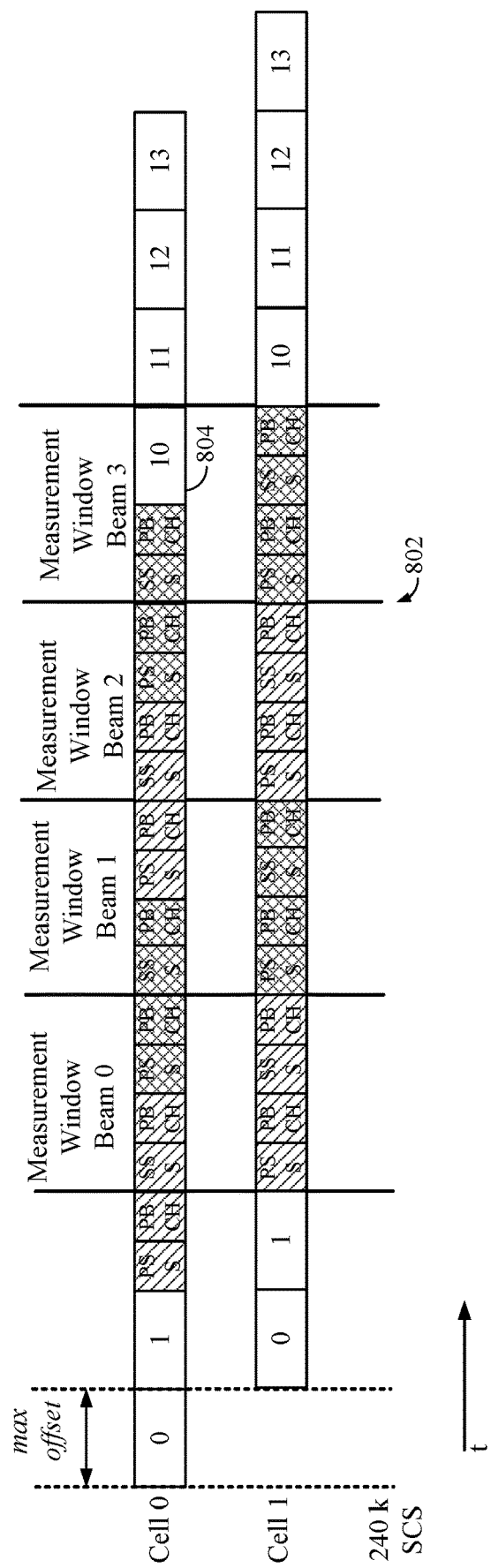
FIG. 8 illustrates example SSB locations within an example half-frame for a 240 kHz SCS, in accordance with certain aspects of the present disclosure.

In a 240 kHz SCS system, the symbol duration is 4.1 μs. Thus, the maximum time offset may always be less than 2 symbols. As shown in FIG. 8, by switching the UE RX beam at the SSB boundary 802 with the 2 symbol offset 804, the UE can ensure that each measurement window includes an SS from both the cell 0 and the cell 1, allowing parallel measurement of cell 0 and cell 1 in each measurement opportunity. For example, the per-SSB switching may ensure that each measurement window includes an SSS from the serving cell and all neighbor cells in the synchronized network.

Thus, per-SSB UE RX beam switching provides more measurement opportunities (e.g., each SSB in the SSBS can be measured with a different UE RX beam), thereby reducing measurement delay. In turn, the UE can better track the serving cell and Ncell signal quality and improve mobility performance (e.g., by making reselection decisions sooner and avoiding RLF). For example, the in the scenario of 120 kHz SCS with a serving cell and 3 Ncells, the UE could have a measurement delay of only 0.25 ms with per-SSB beam switching as compared to 80 ms with SSBS beam switching.

Figure 9:
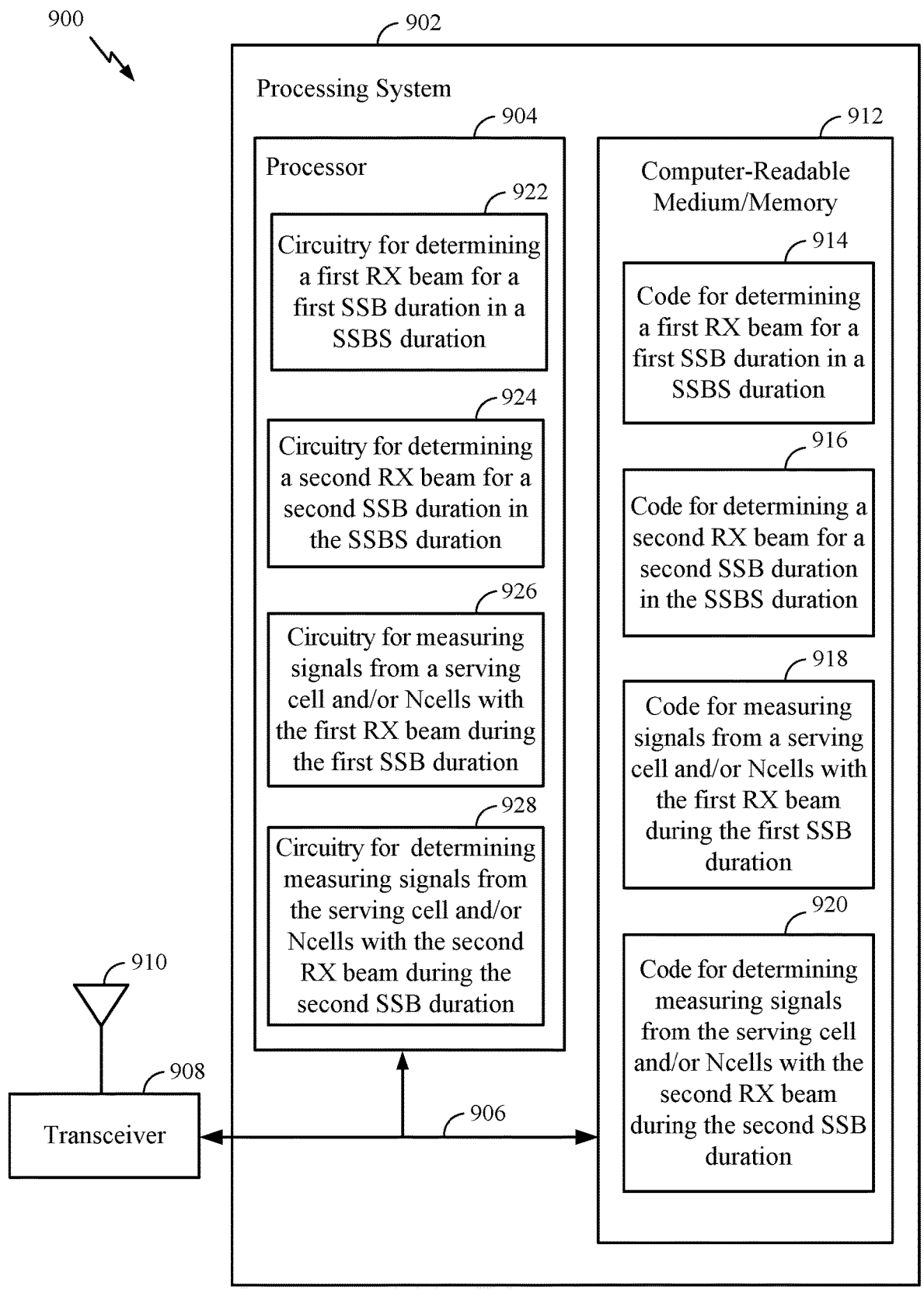
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 6. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 804 to perform the operations illustrated in FIG. 6, or other operations for performing the various techniques discussed herein for per-SSB beam switching. In certain aspects, computer-readable medium/memory 912 stores code 914 for determining a first receive beam of a plurality of receive beams to use for reception during a first SSB duration within a SSBS duration; code 916 for determining a second receive beam of the plurality of receive beams to use for reception during a second SSB duration within the SSBS duration; code 918 for measuring one or more first signals transmitted by a serving cell and/or one or more neighbor cells with the first receive beam during the first SSB duration; and/or code 920 for measuring one or more second signals transmitted by the serving cell and/or the one or more neighbor cells with the second receive beam during the second SSB duration, in accordance with aspects of the present disclosure. In certain aspects, the processor 904 has circuitry configured to implement the code stored in the computer-readable medium/memory 912. The processor 904 includes circuitry 922 for determining a first receive beam of a plurality of receive beams to use for reception during a first SSB duration within a SSBS duration; circuitry 924 for determining a second receive beam of the plurality of receive beams to use for reception during a second SSB duration within the SSBS duration; circuitry 926 for measuring one or more first signals transmitted by a serving cell and/or one or more neighbor cells with the first receive beam during the first SSB duration; and/or circuitry 928 for measuring one or more second signals transmitted by the serving cell and/or the one or more neighbor cells with the second receive beam during the second SSB duration, in accordance with aspects of the present disclosure.

Example Aspects

In a first aspect, a method for wireless communication by a user equipment (UE) includes determining a first receive beam of a plurality of receive beams to use for reception during a first synchronization signal block (SSB) duration within a synchronization signal block set (SSBS) duration; and determining a second receive beam of the plurality of receive beams to use for reception during a second SSB duration within the SSBS duration.

In a second aspect, in combination with the first aspect, the UE switches from using the first receive beam to the second receive beam at an SSB boundary between the first SSB duration and the second SSB duration.

In a third aspect, in combination with one or more of the first and second aspects, the UE measures one or more first signals transmitted by at least one of a serving cell, one or more neighbor cells, or a combination thereof, with the first receive beam during the first SSB duration; and measures one or more second signals transmitted by at least one of the serving cell, the one or more neighbor cells, or the combination thereof, with the second receive beam during the second SSB duration.

In a fourth aspect, in combination with one or more of the first through third aspects, the UE sends one or more measurement reports providing results of measuring the one or more first signals and the one or more second signals.

In a fifth aspect, in combination with one or more of the first through fourth aspects, the one or more first signals and the one or more second signals are transmitted by a combination of the serving cell and at least one neighboring cell.

In a sixth aspect, in combination with one or more of the first through fifth aspects, the UE determines a time offset for switching from using the first receive beam to the second receive beam such that, during each of the first SSB duration and the second SSB duration, a secondary synchronization signal (SSS) from synchronized SSBs of the serving cell and the at least one neighbor cell are measured.

In a seventh aspect, in combination with one or more of the first through sixth aspects, determining the time offset includes determining a maximum time offset based, at least in part, on a timing offset between the serving cell and the neighbor cell having a largest offset with the serving cell and further based on a propagation delay between the serving cell and the neighbor cell.

In an eighth aspect, in combination with one or more of the first through seventh aspects, determining the time offset includes determining the time offset based, at least in part, on a configured subcarrier spacing (SCS).

In a ninth aspect, in combination with one or more of the first through eighth aspects, determining the time offset includes determining a maximum time offset between the serving cell and the neighbor cell having a largest offset with the serving cell; determining a symbol duration based on a configured subcarrier spacing (SCS); and determining a number of symbols for the time offset to be greater than a number of symbols in the maximum time offset between the serving cell and the neighbor cell.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), the method comprising:
   using a first receive beam of a plurality of receive beams for reception during a first synchronization signal block (SSB) duration within a synchronization signal block set (SSBS) duration;
   determining a time offset for switching to a second receive beam of the plurality of receive beams for reception during a second SSB duration within the SSBS duration such that, during each of the first SSB duration and the second SSB duration, a secondary synchronization signal (SSS) from synchronized SSBs of a serving cell and at least one neighbor cell of one or more neighbor cells is measured;
   measuring one or more first signals transmitted by at least one of the serving cell, one or more neighbor cells, or a combination thereof, with the first receive beam during the first SSB duration, wherein the one or more first signals includes the SSS;
   switching to the second receive beam of the plurality of receive beams for reception during the second SSB duration within the SSBS duration; and
   measuring one or more second signals transmitted by at least one of the serving cell, the one or more neighbor cells, or the combination thereof, with the second receive beam during the second SSB duration, wherein the one or more second signals includes the SSS.

2. The method of claim 1, wherein switching to the second receive beam is at an SSB boundary between the first SSB duration and the second SSB duration.

3. The method of claim 1, further comprising sending one or more measurement reports providing results of measuring the one or more first signals and the one or more second signals.

4. The method of claim 1, wherein the one or more first signals and the one or more second signals are transmitted by a combination of the serving cell and at least one neighbor cell of the one or more neighbor cells.

5. The method of claim 1, wherein determining the time offset comprises determining a maximum time offset based, at least in part, on a timing offset between the serving cell and a neighbor cell of the one or more neighbor cells having a largest offset with the serving cell and further based on a propagation delay between the serving cell and the neighbor cell.

6. The method of claim 1, wherein determining the time offset comprises determining the time offset based, at least in part, on a configured subcarrier spacing (SCS).

7. The method of claim 1, wherein determining the time offset comprises:
   determining a maximum time offset between the serving cell and a neighbor cell of the one or more neighbor cells having a largest offset with the serving cell;
   determining a symbol duration based on a configured subcarrier spacing (SCS); and
   determining a number of symbols for the time offset to be greater than a number of symbols in the maximum time offset between the serving cell and the neighbor cell.

8. An apparatus for wireless communication, the apparatus comprising:
   memory storing computer executable code; and
   at least one processor configured to execute the computer executable code and cause the apparatus to:
   use a first receive beam of a plurality of receive beams for reception during a first synchronization signal block (SSB) duration within a synchronization signal block set (SSBS) duration;
   determine a time offset for switching to a second receive beam of the plurality of receive beams for reception during a second SSB duration within the SSBS duration such that, during each of the first SSB duration and the second SSB duration, a secondary synchronization signal (SSS) from synchronized SSBs of a serving cell and at least one neighbor cell of one or more neighbor cells is measured;
   measure one or more first signals transmitted by at least one of the serving cell, one or more neighbor cells, or a combination thereof, with the first receive beam during the first SSB duration, wherein the one or more first signals includes the SSS;
   switch to the second receive beam of the plurality of receive beams for reception during the second SSB duration within the SSBS duration; and
   measure one or more second signals transmitted by at least one of the serving cell, the one or more neighbor cells, or the combination thereof, with the second receive beam during the second SSB duration, wherein the one or more second signals includes the SSS.

9. The apparatus of claim 8, wherein the at least one processor is configured to cause the apparatus to switch to the second receive beam at a SSB boundary between the first SSB duration and the second SSB duration.

10. The apparatus of claim 8, wherein the at least one processor is further configured to cause the apparatus to send one or more measurement reports providing results of measuring the one or more first signals and the one or more second signals.

11. The apparatus of claim 8, wherein the one or more first signals and the one or more second signals are transmitted by a combination of the serving cell and at least one neighbor cell of the one or more neighbor cells.

12. The apparatus of claim 8, wherein the at least one processor being configured to cause the apparatus to determine the time offset comprises the at least one processor being configured to determine a maximum time offset based, at least in part, on a timing offset between the serving cell and a neighbor cell of the one or more neighbor cells having a largest offset with the serving cell and further based on a propagation delay between the serving cell and the neighbor cell.

13. The apparatus of claim 8, wherein the at least one processor being configured to cause the apparatus to determine the time offset comprises the at least one processor being configured to determine the time offset based, at least in part, on a configured subcarrier spacing (SCS).

14. The apparatus of claim 8, wherein the at least one processor being configured to cause the apparatus to determine the time offset comprises the at least one processor being configured to:
 determine a maximum time offset between the serving cell and a neighbor cell of the one or more neighbor cells having a largest offset with the serving cell;
 determine a symbol duration based on a configured subcarrier spacing (SCS); and
 determine a number of symbols for the time offset to be greater than a number of symbols in the maximum time offset between the serving cell and the neighbor cell.

15. An apparatus for wireless communication, the apparatus comprising:
 means for using a first receive beam of a plurality of receive beams for reception during a first synchronization signal block (SSB) duration within a synchronization signal block set (SSBS) duration;
 means for determining a time offset for switching to a second receive beam of the plurality of receive beams for reception during a second SSB duration within the SSBS duration such that, during each of the first SSB duration and the second SSB duration, a secondary synchronization signal (SSS) from synchronized SSBs of a serving cell and at least one neighbor cell of one or more neighbor cells is measured;
 means for measuring one or more first signals transmitted by at least one of the serving cell, one or more neighbor cells, or a combination thereof, with the first receive beam during the first SSB duration, wherein the one or more first signals includes the SSS;
 means for switching to the second receive beam of the plurality of receive beams for reception during the second SSB duration within the SSBS duration; and
 means for measuring one or more second signals transmitted by at least one of the serving cell, the one or more neighbor cells, or the combination thereof, with the second receive beam during the second SSB duration, wherein the one or more second signals includes the SSS.

16. The apparatus of claim 15, wherein means for switching to the second receive beam comprises means for switching to the second receive beam at a SSB boundary between the first SSB duration and the second SSB duration.

17. The apparatus of claim 15, further comprising means for sending one or more measurement reports providing results of measuring the one or more first signals and the one or more second signals.

18. The apparatus of claim 15, wherein the one or more first signals and the one or more second signals are transmitted by a combination of the serving cell and at least one neighbor cell of the one or more neighbor cells.

19. The apparatus of claim 15, wherein means for determining the time offset comprises means for determining a maximum time offset based, at least in part, on a timing offset between the serving cell and a neighbor cell of the one or more neighbor cells having a largest offset with the serving cell and further based on a propagation delay between the serving cell and the neighbor cell.

20. The apparatus of claim 15, wherein means for determining the time offset comprises means for determining the time offset based, at least in part, on a configured subcarrier spacing (SCS).

21. The apparatus of claim 15, wherein means for determining the time offset comprises:
 means for determining a maximum time offset between the serving cell and a neighbor cell of the one or more neighbor cells having a largest offset with the serving cell;
 means for determining a symbol duration based on a configured subcarrier spacing (SCS); and
 means for determining a number of symbols for the time offset to be greater than a number of symbols in the maximum time offset between the serving cell and the neighbor cell.

22. A non-transitory computer readable medium storing computer executable code thereon, the computer executable code comprising:
 code for using a first receive beam of a plurality of receive beams for reception during a first synchronization signal block (SSB) duration within a synchronization signal block set (SSBS) duration;
 code for determining a time offset for switching to a second receive beam of the plurality of receive beams for reception during a second SSB duration within the SSBS duration such that, during each of the first SSB duration and the second SSB duration, a secondary synchronization signal (SSS) from synchronized SSBs of a serving cell and at least one neighbor cell of one or more neighbor cells is measured;
 code for measuring one or more first signals transmitted by at least one of the serving cell, one or more neighbor cells, or a combination thereof, with the first receive beam during the first SSB duration, wherein the one or more first signals includes the SSS;
 code for switching to the second receive beam of the plurality of receive beams for reception during the second SSB duration within the SSBS duration; and
 code for measuring one or more second signals transmitted by at least one of the serving cell, the one or more neighbor cells, or the combination thereof, with the second receive beam during the second SSB duration, wherein the one or more second signals includes the SSS.

23. The non-transitory computer readable medium of claim 22, wherein the code for switching to the second receive beam comprises code for switching to the second receive beam at a SSB boundary between the first SSB duration and the second SSB duration.

* * * * *